United States Patent [19]

Uphues et al.

[11] Patent Number: 4,977,294
[45] Date of Patent: Dec. 11, 1990

[54] QUATERNARY AMMONIUM PHOSPHATES BASED ON AMINO-FUNCTIONAL POLYESTERS

[75] Inventors: Guenter Uphues, Monheim; Uwe Ploog, Haan; Wolfgang Becker, Moenchengladbach; Irmhild Goebel, Dusseldorf, all of Fed. Rep. of Germany

[73] Assignee: Henkel Kommanditgesellschaft auf Aktien, Duesseldorf-Holthausen, Fed. Rep. of Germany

[21] Appl. No.: 319,449

[22] Filed: Mar. 3, 1989

[30] Foreign Application Priority Data

Mar. 4, 1988 [DE] Fed. Rep. of Germany ....... 3807069

[51] Int. Cl.$^5$ ................................................ C07F 9/02
[52] U.S. Cl. .................................... 558/208; 8/115.54
[58] Field of Search ......................................... 558/208

[56] References Cited

U.S. PATENT DOCUMENTS

| | | | |
|---|---|---|---|
| 3,082,227 | 3/1963 | Sherr et al. | 260/404.5 |
| 3,619,274 | 1/1971 | Proffitt, Jr. | 558/208 |
| 4,727,177 | 2/1988 | Saiki et al. | 558/208 |

OTHER PUBLICATIONS

Makino et al., Chem. Abst., 111-167387d, (1989).
Uphues et al., Chem. Abst., 111-176140v, (1989).
Melliand Textilberichte, 1979, pp. 263-267.

*Primary Examiner*—Cecilia Shen
*Attorney, Agent, or Firm*—Ernest G. Szoke; Wayne C. Jaeschke; Real J. Grandmaison

[57] ABSTRACT

Quaternary ammonium phosphates produced by reacting a dicarboxylic acid with an alkoxylated tertiary amine to prepare an amino-functional polyester, mixing the polyester in the presence of water with a phosphoric acid ester, and reacting the mixture with an alkylene oxide at elevated pressure and temperature. The quaternary ammonium phosphates are useful as anti-static agents for textile fiber materials.

7 Claims, No Drawings

QUATERNARY AMMONIUM PHOSPHATES BASED ON AMINO-FUNCTIONAL POLYESTERS

BACKGROUND OF THE INVENTION

1. Field of the Invention:

The invention relates to quaternary ammonium phosphates based on amino-functional polyesters, a process for their production and their use as anti-static agents for textile fiber materials.

2. Discussion of Related Art:

A number of anti-static agents are known for avoiding electrostatic charges during the processing and use of textile fiber materials. For example, in "Melliand Textilberichte" 1979, 263, quaternary ammonium methosulfates, ammonium chlorides and ammonium alkylphosphates are described as anti-static agents. The heatstability of such ammonium methosulfates and ammonium chlorides is, however, frequently not satisfactory. Chlorides in particular promote the corrosion of metallic apparatus parts. A further noted disadvantage is the use of dimethylsulfate, a health-endangering substance, for the production of ammonium methosulfates. Ammonium alkyl phosphates have no, or only a very weak, anti-static effect when there is a low moisture content in the air.

U.S. Pat. No. 3,082,227 discloses quaternary ammonium salts with an anti-static effect of the general formula

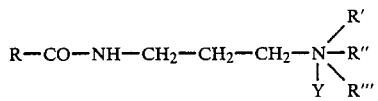

in which R represents an aliphatic or alicyclic radical with at least 7 carbon atoms, R' and R" represent an alkyl radical with 1 to 3 carbon atoms or a monohydroxy alkyl radical with 2 to 3 carbon atoms, R''' represents a monohydroxy alkyl radical with 2 to 3 carbon atoms and Y represents the anion of an inorganic acid. The salts particularly of strong inorganic acids promote the corrosion of metallic parts to an increased degree.

An object of this invention thus comprises in developing an anti-static agent with a high anti-static effectiveness independent of the moisture content in the air, and with high heatstability. In addition, the antistatic agent should be able to be produced in a simple manner from easily accessible starting materials in the absence of health-endangering materials and easily handled as well as having no corrosive effect with respect to metallic surfaces.

DESCRIPTION OF THE INVENTION

Other than in the operating examples, or where otherwise indicated, all numbers expressing quantities of ingredients or reaction conditions used herein are to be understood as modified in all instances by the term "about".

It has surprisingly been found that the high demands made on the anti-static agents to be developed are met by quaternary ammonium phosphates based on amino-functional polyesters.

Accordingly, the subject of this invention is a quaternary ammonium phosphate, produced by (a) reacting a dicarboxylic acid of the general formula I, $$HOOC-R-COOH \quad (I)$$

in which R represents an aliphatic, alicyclic or aromatic, alternatively substituted, radical containing 1 to 10 carbon atoms, with an alkoxylated tertiary amine of the general formula II

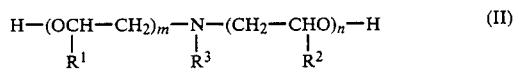

in which $R^3$ represents a saturated or unsaturated, straight-chain or branched, substituted or unsubstituted alkyl radical containing 1 to 20 carbon atoms, $R^1$ and $R^2$ are the same or different and represent H or $CH_3$, m and n are numbers between 1 and 20, with the proviso that the sum of m and n is from 2 to 30, and the degree of polymerization of the polyester is from 2 to 50, (b) mixing the amino-functional polyester obtained in the presence of water at 50° to 80° C. with a mono- and/or dialkylphosphoric acid ester of the general formula IIIa or IIIb

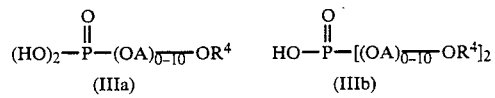

in which $R^4$ represents a saturated or unsaturated, straight-chain or branched, substituted or unsubstituted alkyl radical containing 6 to 22 carbon atoms, and A represents an alkylene radical containing 2-4 carbon atoms, and (c) reacting the mixture prepared in step (b) with an alkylene oxide containing 2 to 4 carbon atoms at a pressure between 1 and 5 bar and a temperature between 80° and 100° C., with the proviso that the polyalkylether chain of the quaternated amine functions contains 1 to 10 alkylene oxide units.

Preferably, the quaternary ammonium phosphates according to the invention are derived from such amino-functional polyesters by the reaction of dicarboxylic acids of the general formula I with alkoxylated tertiary amines of the general formula II, in which $R^3$ represents a saturated or unsaturated, straight-chain or branched, substituted or unsubstituted alkyl radical having 6 to 20 carbon atoms, and then mixed with mono- and/or dialkyl phosphoric acid esters of the general formulae IIIa and IIIb, in which $R^4$ represents a straight-chain or branched, substituted or unsubstituted, saturated alkyl radical having 8 to 18 carbon atoms or a straight-chain or branched, substituted or unsubstituted unsaturated alkyl radical having 18 to 22 carbon atoms, and A represents an ethylene and/or isopropylene radical. It is particularly preferred that the quaternary ammonium phosphates contain 1 to 5 ethylene oxide units and/or propylene oxide units in the polyalkylether chain.

Another embodiment of the invention is a process for the production of quaternary ammonium phosphates, which is characterized in that amino-functional polyesters having a polymerization degree of 2 to 50, produced in a manner known per se by the reaction of a dicarboxylic acid of the general formula I, $$HOOC-R-COOH \quad (I)$$

in which R represents an aliphatic, alicyclic or aromatic, alternatively substituted radical containing 1 to 10 carbon atoms, with alkoxylated tertiary amines of the general formula II,

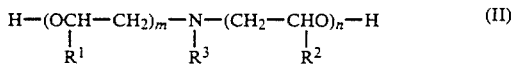
(II)

in which $R^3$ represents a saturated or unsaturated, straight-chain or branched, substituted or unsubstituted alkyl radical containing 1 to 20 carbon atoms, $R^1$ and $R^2$ are the same or different and represent H or $CH_3$, m and n are numbers between 1 and 20, with the proviso that the sum of m and n is from 2 to 30, are mixed with mono- and/or dialkylphosphoric acid esters of the general formulae IIIa and IIIb,

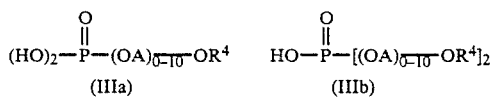

in which $R^4$ represents a saturated or unsaturated, straight-chain or branched, substituted or unsubstituted alkyl group containing 6 to 22 carbon atoms and A represents an alkylene group having 2 to 4 carbon atoms, in the presence of water at 50° to 80° C. and then reacted with an alkylene oxide containing 2 to 4 carbon atoms at a pressure between 1 and 5 bar and at a temperature between 80° and 100° C., with the proviso that the polyalkylether chain of the quaternary amine functions contains 1 to 10 alkylene oxide units.

The amino-functional polyesters used for the production of the quaternary ammonium phosphates according to the invention may be obtained as in German patent application No. 30 32 216 by the condensation of alkoxylated, tertiary amines of the general formula II with dicarboxylic acids of the general formula I at temperatures between 180° and 260° C., if necessary in the presence of non-water-miscible organic solvents, for example xylol or toluol, for the azeotropic removal of by-products of the reaction under the exclusion of atmospheric oxygen. The reaction is complete when the acid number of the water- and solvent-free reaction mixture has fallen below the value 10. The amino-functional polyesters have a polymerization degree of between 2 and 50 if per mole of alkoxylated, tertiary amine of the general formula II, 0.8 to 1.1 mole of dicarboxylic acid of the general formula I is used.

As dicarboxylic acids of the general formula I, aliphatic, alicyclic and/or aromatic, alternatively substituted dicarboxylic acids are suitable, e.g. malonic acid, maleic acid, fumaric acid, succinic acid, hydroxy malonic acid, malic acid, chlorethane dicarboxylic acid, oxalic acid and/or terephthalic acid. If oxalic acid is used, R is not present in the general formula I. Particularly suitable aliphatic dicarboxylic acids include acids containing 6 to 10 carbon atoms such as adipic acid, pimelic acid, suberic acid, azelaic acid and/or sebacic acid. Instead of the free acids, derivatives of these acids such as the anhydrides, halides and dimethylesters in equimolar quantities can also be used with the same result. Preferably, however, the free dicarboxylic acids are used.

The alkoxylated, tertiary amines of the general formula II used for the production of amino-functional polyesters may be derived from primary alkyl- and/or alkenyl amines, for example, from methyl amine, ethyl amine, butyl amine, octyl amine, decyl amine, dodecyl amine, cetyl amine, oleyl amine, linoleyl amine, cocinyl amine and stearyl amine. Alkyl amines which are produced from coconut oil or tallow are preferred. In these cases, $R^3$ in the general formula II represents a radical which is derived from coconut oil or tallow. The alkyl- and/or alkenyl amines may be alkoxylated in a manner known per se at a temperature of between 130° and 180° C. with ethylene oxide and/or propylene oxide. The degree of alkoxylation may vary within wide limits and lies between 2 and 30 (sum of m and n).

The mono- and/or dialkylphosphoric acid esters of the general formulae IIIa and IIIb used for the production of quaternary ammonium phosphates based on amino-functional polyesters may also be obtained according to processes known in the literature. For the production of the phosphoric acid esters, saturated or unsaturated, straight-chain or branched, substituted or unsubstituted, preferably alkoxylated alcohols containing 6 to 22 carbon atoms and/or their alkoxylates are used as educts. Preferably, straight-chain or branched, substituted or unsubstituted, saturated, ideally alkoxylated alcohols containing 8 to 18 carbon atoms, or straight-chain or branched, substituted or unsubstituted, unsaturated, ideally alkoxylated alcohols containing 18 to 22 carbon atoms are used, e.g. 2- ethylhexanol, n-octanol, isononyl-, decyl-, dodecyl-, isotridecyl-, tetradecyl-, hexadecyl-, octadecyl-, octadecenyl-, eicosenyl-, and docosenyl alcohol, or the corresponding alcohols reacted with 1–10 moles of ethylene- and/or propylene oxide. The phosphating of the alcohols is carried out in a manner known per se, in which for example 3 moles of alcohol are reacted with 1 mole of $P_2O_5$ at 50°–80° C. For the hydrolysis of polyphosphoric acid compounds there then follows treatment with water for several hours at 90°–100° C.

For the production of the quaternary ammonium phosphates according to the invention, mixtures of amino-functional polyesters, mono- and/or dialkylphosphoric acid esters, water and possibly polar organic solvents are prepared, with the proviso that per amine equivalent of amino-functional polyester, 1 to 1.1 acid equivalents of phosphoric acid partial esters are used. As polar organic solvents, aliphatic alcohols containing 1 to 6 carbon atoms may be used, e.g. methanol, ethanol, n-propanol, i-propanol, n-butanol, n-hexanol, ethylene glycol, propylene glycol and/or hexylene glycol, such that the volume ratio of water:organic polar solvent is between 10:1 and 1:4. The quantity of water, possibly in combination with polar organic solvents, is preferably so adjusted that the content of quaternary ammonium phosphates in the products lies between 30 and 80% by weight. Into these mixtures containing amino-functional polyesters, mono- and/or dialkyl phosphoric acid esters, water and possibly polar organic solvents, alkylene oxides containing 2 to 4 carbon atoms are then introduced in a manner known per se at a pressure of between 1 and 5 bar and a temperature of between 80° and 100° C., with the proviso that the polyalkylether chain of the quaternated amine functions contains 1 to 10 alkylene oxide units. The reactions are preferably effected with ethylene oxide and/or propylene oxide, with the proviso that the polyalkylether chain contains 1 to 5 alkylene oxide units.

The quaternary ammonium phosphates based on amino-functional polyesters which are obtained in high yields according to the invention process are yellow to light brown, low-viscosity fluids, and are miscible with water without gel formation. They have a high antistatic effect on textile fiber materials, which is to a large extent independent of the moisture content in the air, they have no corrosive effect on metallic surfaces and have a high thermostability.

The use of the quaternary ammonium phosphates based on amino-functional polyesters as anti-static agents for textile fiber materials is thus also an embodiment of the invention.

The term "textile fiber materials" as used herein is intended to cover natural fibers, e.g. cotton, wool and/or rayon staple fiber, synthetic fibers, e.g. polyacrylonitrile, polyester, polyamide, triacetate, polyethylene and/or polypropylene, as well as mixtures of natural and synthetic fibers. The textile fiber materials may be in the form of flock, slubbing, knitting yarn, weaving yarn, sewing thread, woven goods, fabric or non-wovens. The fiber material may be unbleached, bleached or colored. As far as the yarns are concerned, these may be both filament and fiber yarns.

The quaternary ammonium phosphates according to the invention may be applied to the textile fiber materials using the usual apparatus. The application thereof according to an exhaustion process, e.g. on coloring apparatus, may be carried out from an aqueous solution having a solution ratio between 1:5 and 1:40 and a solution pH-value of between 3.0 and 8.0 at a temperature between 25° and 80° C. and a concentration based on the weight of the goods of 1 to 5% by weight of antistatic active substances. The quaternary ammonium phosphates can also be applied according to a forced application process, e.g. by means of foularding, galetten application, via dosing pump systems, as are usual in the production of synthetic filament yarns, or by spraying on to textile fiber materials. In the foulard process, depending on the desired squeezing effect and the desired coating one may operate with a concentration of between 1 and 50 g/liter of liquor, based on 100% active substance.

The following examples illustrate the production of quaternary ammonium phosphates and use thereof in accordance with this invention.

EXAMPLE 1

524.0 g (0.74 amine equivalents) of a polyester obtained from stearyl amine-containing 5 ethylene oxide units and adipic acid (molar ratio=1:1) was placed together with 200.0 g of water and 113.7 g (0.74 acid equivalents) of a mixture of mono- and di-2-ethylhexyl-phosphoric acid esters (weight ratio=4:3) in an autoclave at 50° C. and reacted for 4 hours with 162.3 g (3.69 mole) of ethylene oxide at 85° C. /3.5 bar.

998 g of a yellow, medium-viscous clear, easily-diluted-with-water liquid was obtained.

EXAMPLE 2

Under the conditions given in example 1, 419.0 g (1.02 amine equivalents) of a polyester of cocimyl amine containing 2 ethylene oxide units and adipic acid (molar ratio=1:1), 200.0 g of water and 157.2 g (1.02 acid equivalents) of a mixture of mono-and di-2-ethyl-hexyl-phosphoric acid esters was reacted with 223.8 g (5.08 mole) of ethylene oxide.

994 g of a yellow, medium-viscous, clear, easily-diluted-with-water liquid was obtained.

Test Procedure

1. Application in the exhaustion process. Samples of polyester and polyacrylonitrile fibers were dipped for 20 minutes at a temperature of 40°–45° C. in an aqueous solution which, based on the weight of the fibers contained 3% by weight respectively of one of the quaternary ammonium phosphates from Example 1 or Example 2. After this, they were spun and dried for 3 minutes at 120° C. The fabric samples were climatized at 22° C. and 62–65% relative humidity (Climate I), and at 23° C. and 25% relative humidity (Climate II), and tested as follows:

(a) The Field Half-value Decay Time (FHT) was measured on an electro-static voltmeter (measurement of the frictional electrification). FHT is the time in seconds in which the charge measured immediately after rubbing on steel has fallen to half its value.

(b) The electric surface resistance in Ohms was measured with a Siemens electrode on a teraohmmeter.

| Evaluation Scheme antistatic effect | | |
|---|---|---|
| | FHT (sec.) | Surface resistance (Ohms) |
| +++ very good | 0 to 0.3 | $1 \times 10^6$ to $1 \times 10^8$ |
| ++ good | 0.3 to 1.0 | $1 \times 10^8$ to $1 \times 10^9$ |
| + satisfactory | 1.0 to 2.0 | $1 \times 10^9$ to $1 \times 10^{10}$ |
| 0 sufficient | 2.0 to 3.0 | $1 \times 10^{10}$ to $5 \times 10^{10}$ |
| − insufficient | >3.0 | $>5 \times 10^{10}$ |

Results Table

| Fabric | Substance | Climate I | | Climate II | |
|---|---|---|---|---|---|
| | | FHT | Ohm | FHT | Ohm |
| Polyester | untreated | − | − | − | − |
| Polyester | Ex. 1 | +++ | ++ | ++ | + |
| Polyester | Ex. 2 | +++ | ++ | ++ | + |
| Polyacrylonitrile | untreated | − | − | − | − |
| Polyacrylonitrile | Ex. 1 | +++ | ++ | ++ | 0 |
| Polyacrylonitrile | Ex. 2 | ++ | ++ | + | 0 |

2. Application according to the Foulard process. Fabric samples of polyester- and polyacrylonitrile fibers were treated by the Foulard process as follows:

| | |
|---|---|
| Liquor temperature | 25° C. |
| Liquor uptake | 100% by weight for Polyester |
| | 120% by weight for Polyacrylonitrile |
| Product coatings | 0.25% by weight; 0.5% by weight; 1.0% by weight; 2.0% by weight |

The treated samples were then dried for 3 minutes at 120° C.

In addition, in the case of the polyester the samples were divided and each fixed for 30 seconds at 180° C. Testing and evaluation were carried out as described above under 1.

Results Table

| | | \multicolumn{8}{c|}{Product coating} | | | | | | | |
|---|---|---|---|---|---|---|---|---|---|
| | | 0.25% | | 0.5% | | 1.0% | | 2.0% | |
| Fabric | Substance | FHT | Ohm | FHT | Ohm | FHT | Ohm | FHT | Ohm |
| Climate I | | | | | | | | | |
| Polyester | untreated | — | — | — | — | — | — | — | — |
| Polyester | Ex. 1 | +++ | +++ | +++ | +++ | +++ | +++ | +++ | +++ |
| Polyester | Ex. 1, fixed | +++ | +++ | +++ | +++ | +++ | +++ | +++ | +++ |
| Polyester | Ex. 2 | +++ | +++ | +++ | +++ | +++ | +++ | +++ | +++ |
| Polyester | Ex. 2, fixed | +++ | +++ | +++ | +++ | +++ | +++ | +++ | +++ |
| Polyacrylonitrile | untreated | — | — | — | — | — | — | — | — |
| Polyacrylonitrile | Ex. 1 | +++ | ++ | +++ | ++ | +++ | ++ | +++ | +++ |
| Polyacrylonitrile | Ex. 2 | +++ | ++ | +++ | ++ | +++ | +++ | +++ | +++ |
| Climate II | | | | | | | | | |
| Polyester | untreated | — | — | — | — | — | — | — | — |
| Polyester | Ex. 1 | ++ | + | ++ | + | +++ | + | +++ | + |
| Polyester | Ex. 1, fixed | ++ | 0 | ++ | 0 | ++ | + | +++ | + |
| Polyester | Ex. 2 | ++ | 0 | ++ | + | +++ | + | +++ | + |
| Polyester | Ex. 2, fixed | + | 0 | ++ | 0 | ++ | + | +++ | + |
| Polyacrylonitrile | untreated | — | — | — | — | — | — | — | — |
| Polyacrylonitrile | Ex. 1 | ++ | 0 | ++ | 0 | ++ | + | +++ | + |
| Polyacrylonitrile | Ex. 2 | + | 0 | ++ | 0 | ++ | + | +++ | + |

We claim:

1. A quaternary ammonium phosphate produced by
(a) reacting a dicarboxylic acid of the general formula I,

HOOC—R—COOH    (I)

in which R represents an aliphatic, alicyclic or aromatic, substituted or unsubstituted radical containing 1 to 10 carbon atoms, with an alkoxylated tertiary amine of the general formula II,

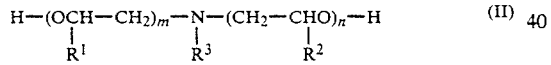

H—(OCH—CH$_2$)$_m$—N—(CH$_2$—CHO)$_n$—H    (II)
           |               |            |
           R$^1$           R$^3$        R$^2$ in which R$^3$ represents a saturated or unsaturated, straight-chain or branched, substituted or unsubstituted alkyl radical containing 1 to 20 carbon atoms, R$^1$ and R$^2$ are the same or different and represent H or CH$_3$, m and n are numbers between 1 and 20, with the proviso that the sum of m+n is from 2 and 30, and the degree of polymerization of the polyester is from 2 to 50;
(b) mixing- the amino-functional polyester obtained in the presence of water at about 50° to about 80° C. with a mono- and/or dialkyl phosphoric acid ester of the general formulae IIIa or IIIb

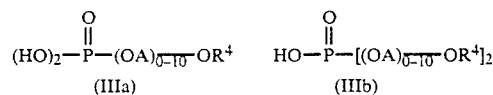

$$(HO)_2-\overset{\overset{O}{\|}}{P}-(OA)_{\overline{0-10}}-OR^4 \qquad HO-\overset{\overset{O}{\|}}{P}-[(OA)_{\overline{0-10}}-OR^4]_2$$
         (IIIa)                            (IIIb)

in which R$^4$ represents a saturated or unsaturated, straight-chain or branched, substituted or unsubstituted alkyl radical containing 6 to 22 carbon atoms and A represents an alkylene radical containing 2 to 4 carbon atoms, and
(c) reacting the mixture prepared in step (b) with an alkylene oxide containing 2 to 4 carbon atoms at a pressure between about 1 and about 5 bar and a temperature between about 80° and about 100° C., with the proviso that the polyalkylether chain of the quaternated amine functions contains 1 to 10 alkylene oxide units.

2. A quaternary ammonium phosphate according to claim 1 wherein in the general formulae II, IIIa and IIIb, R$^3$ represents a saturated or unsaturated, straight-chain or branched, substituted or unsubstituted alkyl radical having 6 to 20 carbon atoms, R$^4$ represents a straight-chain or branched, substituted or unsubstituted, saturated alkyl radical having 8 to 18 carbon atoms or a straight-chain or branched, substituted or unsubstituted, unsaturated alkyl radical having 18 to 22 carbon atoms, and A represents an ethylene and/or isopropylene radical.

3. A quaternary ammonium phosphate according to claim 1 wherein the polyalkylether chain contains about 1 to about 5 ethylene oxide and/or propylene oxide units.

4. A process for the preparation of a quaternary ammonium phosphate comprising;
(a) reacting a dicarboxylic acid of the general formula I,

HOOC—R—COOH    (I)

in which R represents an aliphatic, alicyclic or aromatic, substituted or unsubstituted radical containing 1 to 10 carbon atoms, with an alkoxylated tertiary amine of the general formula II

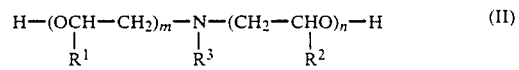

H—(OCH—CH$_2$)$_m$—N—(CH$_2$—CHO)$_n$—H    (II)
           |               |            |
           R$^1$           R$^3$        R$^2$ in which represents a saturated or unsaturated, straight-chain or branched, substituted or unsubstituted alkyl radical containing 1 to 20 carbon atoms, R$^1$ and R$^2$ are the same or different and represent H or CH$_3$, m and n are numbers between 1 and 20, with the proviso that the sum of m+n is from 2 to 30, and the degree of polymerization of the polyester is from 2 to 50, (b) mixing the amino-functional polyester obtained in the presence of water at about 50° to about 80° C. with a mono- and/or dialkyl phosphoric acid ester of the general formulae IIIa or IIIb

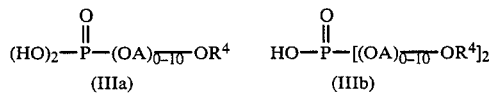

in which $R^4$ represents a saturated or unsaturated, straight-chain or branched, substituted or unsubstituted alkyl radical containing 6 to 22 carbon atoms and A represents an alkylene radical containing 2 to 4 carbon atoms, and (c) reacting the mixture prepared in step (b) with an alkylene oxide containing 2 to 4 carbon atoms at a pressure between about 1 and about 5 bar and a temperature between about 80° and about 100° C., with the proviso that the polyalkylether chain of the quaternated amine functions contains 1 to 10 alkylene oxide units.

5. A process according to claim 4 wherein in the general formulae II, IIIa and IIIb, $R^3$ represents a saturated or unsaturated, straight-chain or branched, substituted or unsubstituted alkyl radical having 6 to 20 carbon atoms, $R^4$ represents a straight-chain or branched, substituted or unsubstituted, saturated alkyl radical having 8 to 18 carbon atoms or a straight-chain or branched, substituted or unsubstituted, unsaturated alkyl group with 18 to 22 carbon atoms and A represents an ethylene and/or isopropylene radical.

6. A process according to claim 4 wherein about 1 to about 1.1 acid equivalents of phosphoric acid partial esters is used per amine equivalent of amino-function polyesters.

7. A process according to claim 4 wherein in the reaction with ethylene oxide and/or propylene oxide is carried out under conditions so that the polyalkylether chain of the quaternated amine functions contains 1 to 5 ethylene oxide and/or propylene oxide units.

* * * * *

UNITED STATES PATENT AND TRADEMARK OFFICE
CERTIFICATE OF CORRECTION

PATENT NO. : 4,977,294

DATED : December 11, 1990

INVENTOR(S) : Uphues et al.

It is certified that error appears in the above-identified patent and that said Letters Patent is hereby corrected as shown below:

At Claim 4, Column 8, line 64, insert --$R^3$-- after "which" and before "represents".

At Claim 7, Column 10, line 18, after "wherein", delete --in--.

Signed and Sealed this

Twenty-fifth Day of June, 1991

Attest:

Attesting Officer

HARRY F. MANBECK, JR.

Commissioner of Patents and Trademarks